J. P. WOYDZIAK.
WINDMILL.
APPLICATION FILED MAY 22, 1908.
949,312.
Patented Feb. 15, 1910.
3 SHEETS—SHEET 1.
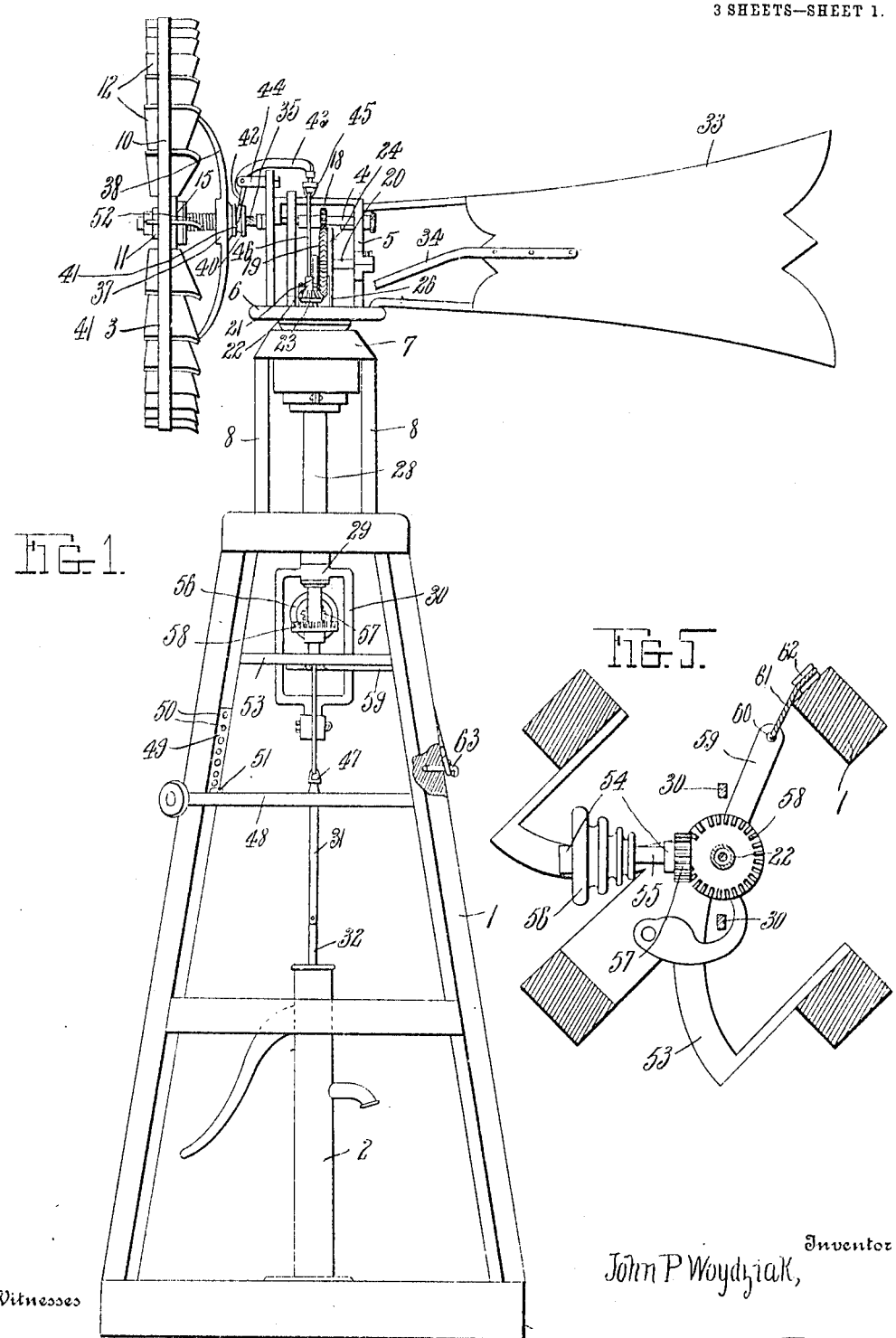
Inventor
John P. Woydziak,

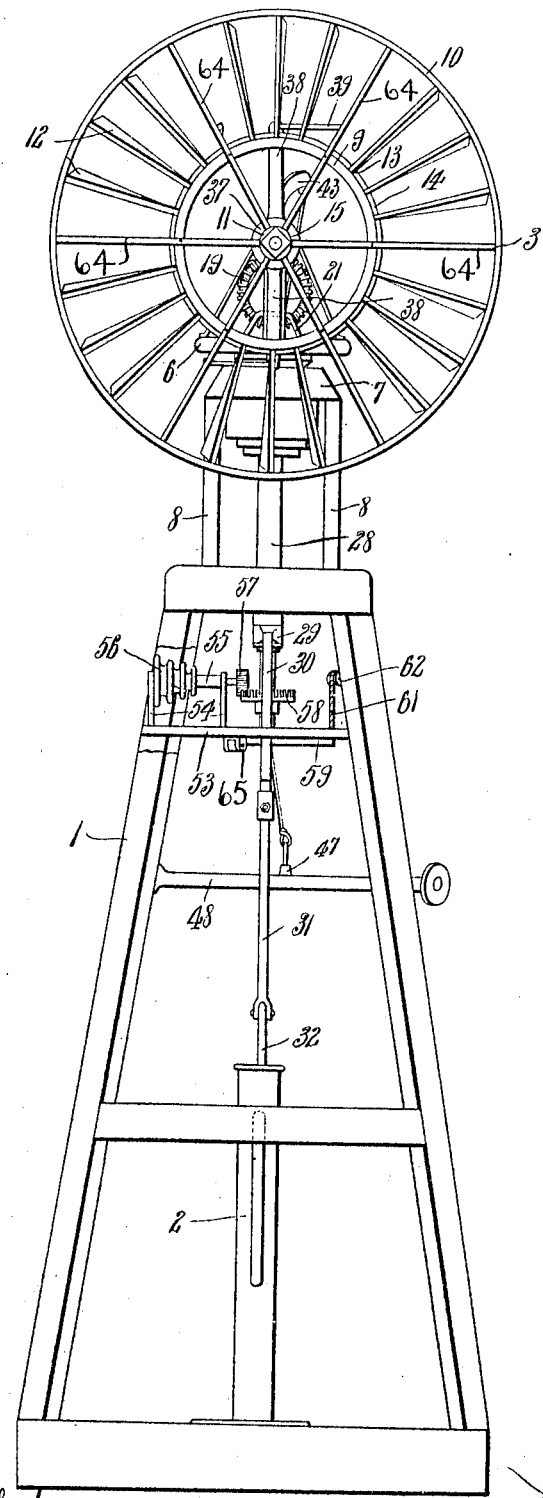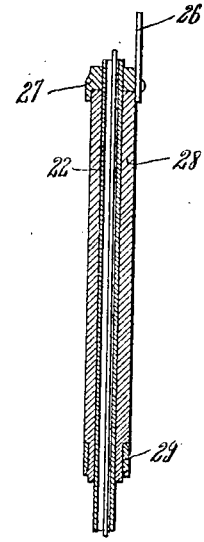

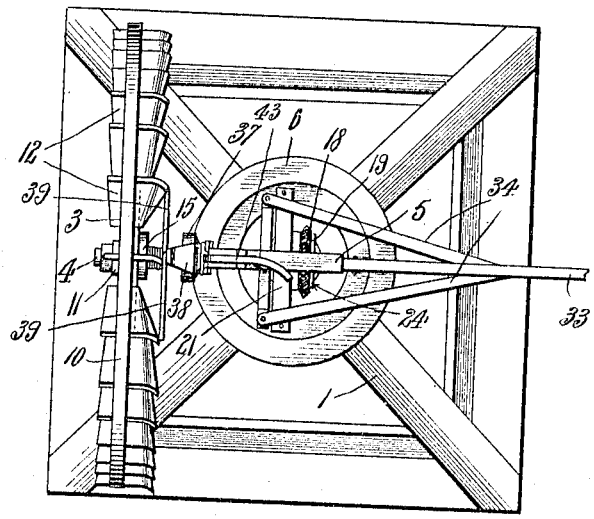
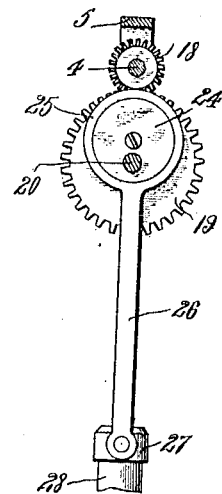
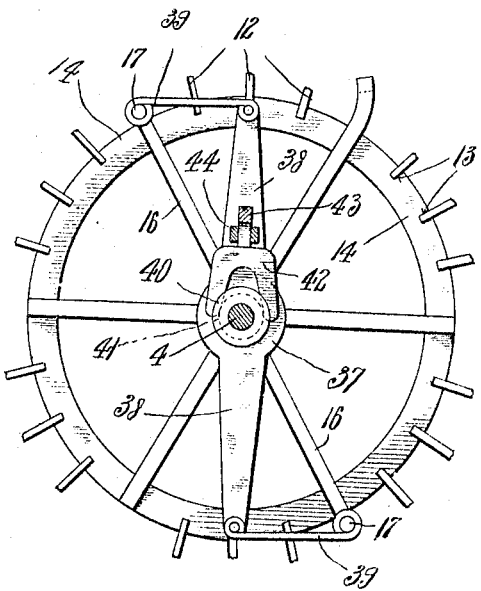
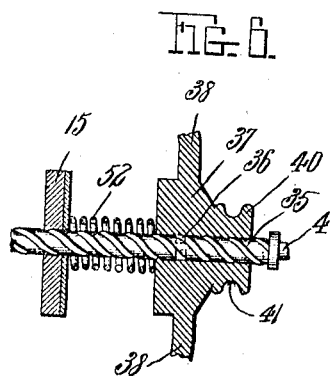

UNITED STATES PATENT OFFICE.

JOHN P. WOYDZIAK, OF DORRANCE, KANSAS.

WINDMILL.

949,312.	Specification of Letters Patent.	Patented Feb. 15, 1910.

Application filed May 22, 1908. Serial No. 434,344.

*To all whom it may concern:*

Be it known that I, JOHN P. WOYDZIAK, a citizen of the United States, residing at Dorrance, in the county of Russell, State of Kansas, have invented certain new and useful Improvements in Windmills; and I do hereby declare the following to be a full, clear, and exact description of the invention, such as will enable others skilled in the art to which it appertains to make and use the same.

The present invention relates to windmills, and it has for its general object the improvement of the construction and operation of the windmill as a whole, and for its especial object the provision of an improved mechanism for regulating and adjusting the position of the vanes with respect to the wind.

To this end, the mechanism in question comprises an internally-toothed collar slidable upon the wind-wheel shaft and engaged with a worm secured thereto, and a ring loosely mounted upon the shaft and connected with said collar and with all of the vanes, whereby the collar when moved in one direction will simultaneously turn all of the vanes into edgewise position to the wind, and when moved in the opposite direction, will return the vanes to oblique or operative position, the movement of the collar being effected either automatically by the increasing pressure of the wind against the vanes, or manually by suitable operating devices, which latter also form a part of the invention.

The invention further resides in the provision of a power-transmission shaft driven by an endwise movable counter shaft which forms one element of a pump-operating mechanism and is itself driven from the main or wheel shaft; and in the particular devices employed for raising and lowering said shaft, to effect the movement of its gears into and out of engagement with those carried by said wheel and transmission shafts.

The preferred embodiment of the invention is illustrated in the accompanying drawings, in which corresponding parts are indicated by the same reference numerals throughout the several views.

Of the said drawings, Figure 1 is a side elevation of the improved windmill. Fig. 2 is a front elevation thereof. Fig. 3 is a plan view. Fig. 4 is a fragmental longitudinal section through the endwise movable sleeve. Fig. 5 is a transverse horizontal section illustrating the gear connections between the endwise movable shaft and the transmission shaft. Fig. 6 is an enlarged detail section illustrating the mounting of the vane-controlling ring and the collar with which the latter is connected. Fig. 7 is a rear elevation of the controlling ring. Fig. 8 is a detail view illustrating the driving connection between the power shaft and the sleeve.

Referring more particularly to the drawings, 1 indicates generally the tower of the windmill, 2 the pump mounted upon the base of the tower and 3 the windwheel carried by the horizontal main or power shaft 4 which latter is journaled in openings formed in the legs of an inverted U-shaped bracket 5 mounted upon a turn table 6 whose stem portion is rotatably fitted in a bearing box 7 supported above the top of the tower by means of vertical braces 8.

The wind-wheel, as shown in Figs. 2 and 3 comprises inner and outer concentric rings 9 and 10 the former of which includes a hub portion 11 rigidly secured to the outer end of the main shaft 4, the connection between said ring and its hub being effected by means of spokes 64. Interposed between the rings 9 and 10 is a radial series of vanes 12 pivotally connected to said rings at their opposite ends, the pivot points being located adjacent the outer or front edges of the vanes, so that the greater portion of each vane extends rearwardly beyond the rings. The rearwardly-extending inner edge of each vane fits in a notch 13 formed in the periphery of a ring 14, hereinafter termed the controlling ring, which ring includes a hub portion 15 loosely mounted upon the shaft 4 and therefore capable of an independent rotation in either direction with respect thereto. The controlling ring and its hub are likewise connected by means of a series of spokes, two of which, as indicated by the numeral 16, extend beyond the ring in question.

The drive shaft 4 carries a spur gear 18 which is located between the legs of the bracket 5 and meshes with a beveled spur gear 19 carried by a horizontal shaft 20 journaled at its rear end in a bearing secured to the rear leg of said bracket, and at its forward end in an opening formed in a bracket 21 mounted upon the turn table 6 which latter is in the form of a ring as shown in Fig. 3, said bearing 21 extending diametrically across the same and being itself provided with a central opening through which projects the upper end of an endwise movable tubular shaft 22, the last-mentioned shaft being provided at such point with a beveled gear 23 which is thus moved into and out of engagement with the gear 19 when said shaft is raised and lowered. The shaft 20 is further provided with an eccentric 24 which is rigidly secured to the gear 19 and carries a strap 25 to which the upper end of a pitman 26 is secured. The lower end of the pitman is in turn fastened to a collar 27 rigidly attached to the upper end of a sleeve 28 through which the shaft 22 loosely passes, the lower end of said sleeve being provided with a second collar 29 to which are rigidly secured the in-bent upper ends of the arms of a yoke 30, the stem of said yoke being connected by a pitman 31 with the pump-rod 32. The wind-wheel further includes a tail 33 whose upper and lower bars are connected respectively to the bracket 5 and to the turn table, the tail being further braced by a pair of rods 34 disposed upon opposite sides thereof, the forward ends of said rods being likewise connected to said turn table.

From the foregoing, it will be apparent that when the wind-wheel is in motion the rotation of the shaft 4 will effect the rotation of the shaft 20 through the gears 18 and 19, the rotation of the last mentioned shaft effecting the endwise reciprocation of the sleeve 28 by means of the eccentric 24 and the connection of its strap with the pitman 26 whose lower end is secured to the collar 27 as above stated. The reciprocation of said sleeve will effect that of the pump rod as will be apparent.

The portion of the wind-wheel shaft between the front leg of the bracket 5 and the hub 15 of the controlling wheel has secured thereto a worm 35 which engages a tooth or pin 36, formed upon the wall of the axial opening or bore of a collar 37, provided with a pair of lateral arms 38 extending in diametrically opposite directions. The outer end of each arm is connected by a link 39 with the terminal 17 of the adjacent spoke 16, said links being disposed at right angles to said arms, as shown. The collar 37 is provided with an integral sleeve 40 having a circumscribing groove 41 formed therein, into which groove project the inturned ends of the arms of a yoke 42 secured to the lower end of a curved lever 43 pivoted adjacent its lower end to the outer end of an arm 44 which projects laterally from the front leg of the bracket 5. The rear or upper end of the lever 43 carries a swiveled eye-bolt 45 to which is fastened the upper end of a wire rope or cable 46 which extends through and below the lower end of the tubular shaft 22 and has its lower end fastened to an upstanding eye-bolt 47 swivelly connected to an operating lever 48 intermediate the ends of the latter. The lever 48 is pivoted at one end to one of the beams of the tower and projects horizontally across to the diametrically opposite tower beam to which latter is secured a plate 49 provided with a vertical series of perforations 50 with which a pin 51 is adapted for interchangeable engagement.

The collar 37 is normally held at the limit of its rearward movement by means of an expansible coil spring 52 which embraces the worm and bears at opposite ends against said collar and the hub of the controlling ring, as a result of which the several vanes are normally held in their operative position, i. e., at an angle of about 45° to the rings 9 and 10, in which position of the vanes their inner pivots are disposed to one side of the corresponding notches in the controlling ring. The spring likewise tends to normally depress the lower end of the curved lever 43, and to elevate its upper end, as a result of which the operating lever 48 is normally forced upwardly, such movement, however, being limited by the contact of said lever with the pin 51 which extends across the upper surface of said lever.

When, however, the lever is manually swung downward, the curved lever will be rocked upon its pivot, thus moving the collar 37 toward the hub of the controlling ring, against the tension of the spring 52. During the movement of said collar, it is rotated by means of the engagement of its tooth or teeth 36 with the worm 35, as a result of which the controlling ring will be given a partial rotation upon the drive shaft independent of the rotation of the latter, the rotation of the controlling ring bringing its notches into alinement with the lower pivots of the vanes and thus moving the vanes into their inoperative position, i. e., at right angles to the rings 9 and 10. In this position, the wind surface presented by the vanes is reduced to a minimum, whereupon the rotation of the wheel will gradually cease. The same effect is likewise obtained automatically by the pressure of the wind itself against the vanes, the vanes being swung upon their pivots, and their exposed surface reduced in direct proportion to the increase of the pressure of the wind.

In order to utilize the rotary movement of the shaft 22 in driving machinery (not shown), located at one side of or at a distance from the windmill, the tower is provided toward its top with a triangular supporting platform 53 having an opening formed therein through which said shaft extends. Upon this platform, is mounted a pair of brackets 54 in which is journaled a horizontal countershaft 55 hereinafter termed the transmission shaft, said shaft carrying a series of stepped pulleys 56 connected by a belt (not shown) with the machinery to be driven. At its inner end, the transmission shaft carries a gear 57 which meshes with a crown gear 58 secured to the lower end of the shaft 22. The shaft 22 is normally held in raised position with its gears 58 and 23 in mesh with the gears 57 and 19 by means of a bar 59 pivoted at its inner end to a depending bracket 65 carried by the platform 53 and provided at its outer end with an eye 60 to which is fastened one end of a cable 61 trained over a pulley 62 carried by a pin set laterally into the adjacent tower beam, the other end of said cable being provided with a hook adapted for engagement with a pin 63 which is likewise set laterally into the last mentioned beam and is disposed below said pulley. The supporting bar 59 is provided with an opening through which the cable 46 passes. By reason of this construction, it will be apparent that when the hook is released from engagement with the pin 63, the supporting bar will be free to swing downward under the weight of the shaft 22, whereupon the gears carried by said shaft will be moved out of engagement with the gears carried by the transmission shaft and the shaft 20, whereupon, the rotation of the former shaft will cease. When, however, downward pressure is applied to the hook end of the cable, the supporting bar will be swung upwardly, raising the shaft 22 and meshing its gears with those carried by the transmission shaft and the shaft 20, the shaft 22 being retained in elevated position by the reëngagement of said hook and pin with each other.

It will be understood from the foregoing, that the adjustment of the vanes of the wind-wheel may be effected either automatically by the pressure of the wind itself, or manually by the operation of the lever 48, in which latter instance, the adjustment of the vanes is possible without terminating the rotation of the wheel shaft. It is also possible to utilize the rotary movement of the endwise movable shaft for driving machinery of various sorts, and by raising or lowering said shaft to start and terminate the rotation of the transmission shaft with which such machinery is directly connected.

Further description of the operation of the machine is considered unnecessary in view of the foregoing, it being understood that modifications and changes may obviously be made within the scope of the appended claims.

What is claimed is:

1. In a windmill, the combination, with a wheel shaft provided with a worm, of a wind-wheel carried by said shaft and including a radial series of pivoted vanes; an interiorly-toothed collar engaged with the worm for movement longitudinally of said shaft; a controlling ring loosely mounted upon said shaft and provided with a circumscribing series of peripheral notches in which the adjacent edges of all of said vanes are engaged; and connecting devices between said collar and said ring, for rotating the latter upon the movement of said collar, to simultaneously adjust the angle of said vanes to the wheel.

2. In a windmill, the combination, with a wheel shaft, of a wind-wheel carried thereby and including a radial series of pivoted vanes; a controlling wheel loosely mounted upon said shaft and provided with a circumscribing series of peripheral notches in which the adjacent edges of all of said vanes are engaged; a member slidable upon said shaft and connected with said ring; and means for rotating said member upon said shaft during its sliding movements, to rotate said ring and simultaneously adjust the angle of said vanes to the wheel.

3. In a windmill, the combination, with a wheel shaft provided with a worm, of a wind-wheel carried by said shaft and including a radial series of pivoted vanes; a member slidable upon said shaft and engaged with said worm for rotation during its sliding movements; a controlling ring loosely mounted upon said shaft and provided with a circumscribing series of peripheral notches in which the adjacent edges of all of said vanes are engaged; connecting devices between said member and said ring, for rotating the latter when said member is moved in either direction, to simultaneously adjust the angle of said vanes to the wheel; means for normally holding said member at the limit of its movement in one direction, to retain the vanes in operative position; and means for moving said member in the opposite direction against the action of said means, to swing the vanes into inoperative position.

4. In a windmill, the combination, with a wheel shaft, of a wind-wheel carried thereby and provided with a radial series of pivoted vanes; a controlling ring loosely mounted upon said shaft and engaged with all of said vanes, said ring being provided with a pair of diametrically-opposite rearwardly-projecting members; a member slidable upon said shaft and provided with a pair of diametrically-opposite members; means connecting each last named member with the adjacent rearwardly-projecting member; and means for effecting the rotation of said sliding member upon said shaft during its movements, to rotate said ring and simultaneously adjust the angle of said vanes to the wheel.

5. In a windmill, the combination, with a wheel shaft, of a wind-wheel carried thereby and provided with a radial series of pivoted vanes; a controlling ring loosely mounted upon said shaft and engaged with all of said vanes, said ring being provided with a pair of diametrically-opposite rearwardly-projecting members; a member slidable upon said shaft and provided with a pair of diametrically-opposite members; means connecting each last named member with the adjacent rearwardly-projecting member; means for effecting the rotation of said sliding member upon said shaft during its movements, to rotate said ring and simultaneously adjust the angle of said vanes; means for normally holding said member at the limit of its movement in one direction, to retain the vanes in operative position; and means for moving said member in the opposite direction against the action of said means, to swing the vanes into inoperative position.

6. In a windmill, the combination, with a tower, a bracket mounted thereon, a wheel shaft journaled in said bracket, and a windwheel carried by said shaft, of an endwise-movable vertical shaft; a horizontal platform secured to the tower and provided with an opening through which the endwise-movable shaft extends; brackets mounted upon said platform, a transmission shaft journaled in said brackets; gear connections between the wheel shaft and the endwise-movable shaft, and between the latter and the transmission shaft; a member pivoted at one end to said platform and arranged for engagement with the lower end of the endwise-movable shaft; means for swinging said pivoted member upwardly, to raise said endwise-movable shaft and engage the various gears comprising said gear connections with each other; and means for retaining said pivoted member in raised position.

In testimony whereof, I affix my signature, in presence of two witnesses.

JOHN P. WOYDZIAK.

Witnesses:
Jos. WOYDZIAK,
M. M. CHUTTEN.